(12) United States Patent
Spotswood et al.

(10) Patent No.: US 7,260,819 B2
(45) Date of Patent: Aug. 21, 2007

(54) SYSTEM AND METHOD FOR SOFTWARE APPLICATION SCOPING

(75) Inventors: Mark Spotswood, San Francisco, CA (US); Sanjeev Chopra, Dublin, CA (US); Stephen R. Fanshier, San Diego, CA (US); Don Ferguson, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 438 days.

(21) Appl. No.: 10/369,892

(22) Filed: Feb. 20, 2003

(65) Prior Publication Data

US 2003/0229888 A1 Dec. 11, 2003

Related U.S. Application Data

(60) Provisional application No. 60/358,787, filed on Feb. 22, 2002.

(51) Int. Cl.
*G06F 9/45* (2006.01)

(52) U.S. Cl. .................................................... 717/177

(58) Field of Classification Search ................ 717/116, 717/177
See application file for complete search history.

(56) References Cited

U.S. PATENT DOCUMENTS

| | | | |
|---|---|---|---|
| 5,680,619 A * | 10/1997 | Gudmundson et al. ...... 717/108 |
| 6,047,323 A | 4/2000 | Krause ........................ 709/227 |
| 6,243,825 B1 | 6/2001 | Gamache et al. ............... 714/4 |
| 6,289,393 B1 | 9/2001 | Phillips et al. |
| 6,345,386 B1 | 2/2002 | Delo et al. |
| 6,360,331 B2 | 3/2002 | Vert et al. ....................... 714/4 |
| 6,418,554 B1 | 7/2002 | Delo et al. |
| 6,546,554 B1 | 8/2003 | Schmidt et al. |
| 6,678,889 B1 * | 1/2004 | Burkett et al. ............... 718/104 |
| 6,834,284 B2 * | 12/2004 | Acker et al. ............ 707/103 R |
| 6,836,889 B1 * | 12/2004 | Chan et al. .................. 719/310 |
| 6,928,457 B2 * | 8/2005 | Jacobs et al. ................ 707/201 |
| 6,961,776 B1 * | 11/2005 | Buckingham et al. ...... 709/229 |
| 7,036,127 B2 * | 4/2006 | Cheng et al. ................ 719/315 |
| 2002/0004848 A1 * | 1/2002 | Sudarshan et al. .......... 709/310 |
| 2002/0147696 A1 * | 10/2002 | Acker et al. .................... 707/1 |
| 2003/0084056 A1 | 5/2003 | DeAnna et al. |

* cited by examiner

*Primary Examiner*—John Chavis
(74) *Attorney, Agent, or Firm*—Fliesler Meyer LLP (57) ABSTRACT

A system and method for application scoping that can be added to the application model for an application server, making it less global-centric and more application-centric. The JNDI tree is configured to allow for an application-private JNDI section. This private JNDI section then acts as a private data repository for the application. Resources that are needed by the application can be stored in the application-specific JNDI tree, and thus "scoped" to that particular application. As applications are added to the system, they can be specified in this way. The overall result is fewer changes at the system-wide or global level. The application scoping features provided by the invention include: Use of application scoped JNDI tree; Application Scoped JDBC DataSources; and Application Scoped Security. Application scoped resources provide two primary advantages—Security, in that resources owned by one application can't be used by another; and Simplified packaging and configuration.

18 Claims, 4 Drawing Sheets

SYSTEM AND METHOD FOR SOFTWARE APPLICATION SCOPING

CLAIM OF PRIORITY

This application claims priority from provisional application "SYSTEM AND METHOD FOR APPLICATION SCOPING SOFTWARE" Application No. 60/358,787 filed Feb. 22, 2002, and which application is incorporated herein by reference.

FIELD OF THE INVENTION

The invention relates to a system and method for application scoping in a Java environment, including the use of an application scoped JNDI tree.

CROSS-REFERENCES

This application is related to co-pending applications U.S. Provisional Patent Application entitled SYSTEM AND METHOD FOR APPLICATION DEPLOYMENT Inventors Mark Spotswood and Sriram Srinivasan, Application No. 60/349,436, filed Jan. 18, 2002, U.S. Utility Patent Application entitled SYSTEM AND METHOD FOR APPLICATION DEPLOYMENT Inventors Mark Spotswood and Sriram Srinivasan, application Ser. No. 10/342,038, filed Jan. 14, 2003, U.S. Provisional Patent Application entitled SYSTEM AND METHOD FOR APPLICATION MANAGEMENT AND DEPLOYMENT Inventors Stephen R. Fanshier and Sriram Srinivasan, Application No. 60/358,628, filed Feb. 21, 2002, and U.S. Utility Patent Application entitled SYSTEM AND METHOD FOR APPLICATION MANAGEMENT AND DEPLOYMENT Inventors Stephen R. Fanshier and Sriram Srinivasan, application Ser. No.10/341,801, filed Jan. 14, 2003, all of which applications are incorporated herein by reference.

BACKGROUND

Java 2 Enterprise Edition (J2EE) applications, for example those developed with WebLogic Server, are packaged in a standard way, defined by the J2EE specifications. J2EE defines component behaviors and packaging in a generic, portable way, postponing run-time configuration until the component is actually deployed on an application server. J2EE includes deployment specifications for Web applications, EJB modules, enterprise applications, client applications, and resource adapters. J2EE does not specify how an application is deployed on the target server—only how a standard component or application is packaged.

For each component type, the specifications define the files required and their location in the directory structure. Components and applications may include Java classes for EJBs and servlets, resource adapters, Web pages and supporting files, XML-formatted deployment descriptors, and JAR files containing other components. An application that is ready to deploy on, for example WebLogic Server contains additional, WebLogic-specific deployment descriptors and, possibly, container classes generated with the WebLogic EJB, RMI, or JSP compilers.

A file created with the Java jar tool bundles the files in a directory into a single Java ARchive (JAR) file, maintaining the directory structure. The Java classloader can search for Java class files (and other file types) in a JAR file the same way that it searches a directory in its classpath. Because the classloader can search a directory or a JAR file, a developer can deploy J2EE components on WebLogic Server in either an "exploded" directory or a JAR file. JAR files are convenient for packaging components and applications for distribution. They are easier to copy, they use up fewer file handles than an exploded directory, and they can save disk space with file compression. If the Administration Server manages a domain with multiple WebLogic Servers, the developer can only deploy JAR files, because the Administration Console does not copy expanded directories to managed servers.

XML Deployment Descriptors

Components and applications have deployment descriptors-XML documents-that describe the contents of the directory or JAR file. Deployment descriptors are text documents formatted with XML tags. The J2EE specifications define standard, portable deployment descriptors for J2EE components and applications. BEA defines additional WebLogic-specific deployment descriptors required to deploy a component or application in the WebLogic Server environment.

Packaging Enterprise Applications

An Enterprise archive contains EJB and Web modules that are part of a related application. The EJB and Web modules are bundled together in another JAR file with an .ear extension. The META-INF subdirectory in an .ear file contains an application.xml deployment descriptor from Sun, which identifies the modules packaged in the ear file. A supplemental deployment descriptor, weblogic-application-.xml contains additional WebLogic-specific deployment information. Within application.xml, a developer can define items such as the modules that make up your application and the security roles used within the application.

When the application is deployed the necessary resources must also be deployed. The traditional method is to modify the global Java Naming Directory Interface (JNDI) tree. The Java Naming Directory Interface (JNDI) provides naming and directory functionality for the system, and allows applications to perform standard directory operations. JNDI is the primary mechanism by which applications store and retrieve Java objects, and is typically independent of any specific implementation. In the JNDI tree, the application environment comprises a number of subtrees or subcomponents of the global JNDI tree, and is initialized as part of the system startup process. However, one of the problems with this traditional method of global JNDI and its use in application packaging and deployment is that it typically involves the input of a system administrator to configure the application to properly run within the global environment. Typically, the administrator accomplishes this configuration process using a configuration tool in which they modify the global JNDI tree. As additional new applications are added to the system, they must be specified in this way. The overall result is a lot of changes at the system-wide or global level, and increased burden for the software developer and/or administrator.

SUMMARY

The invention provides a system and method for application scoping that can be added to the application model for an application server, such as for example WebLogic Server, making it less global-centric and more application-centric. The JNDI tree is configured to allow for an application-private JNDI section. This private JNDI section then acts as a private data repository for the application. Resources that are needed by the application can be stored in the application-specific JNDI tree, and thus "scoped" to that particular application. As applications are added to the system, they can be specified in this way. The overall result is fewer changes at the system-wide or global level. The application scoping features provided by the invention include: Use of application scoped JNDI tree; Application Scoped JDBC DataSources; and Application Scoped Security. Application scoped resources provide two primary advantages to application developers—Security, in that resources owned by one application can't be used by another; and Simplified packaging and configuration.

DETAILED DESCRIPTION

An embodiment of the invention provides a system and method for application scoping that can be added to the application model for an application server such as WebLogic server. The application scoping features provided by the invention include: Use of application scoped JNDI tree; Application Scoped JDBC DataSources; and Application Scoped Security. Application scoped resources provide two primary advantages to application writers—Security, in that resources owned by one application can't be used by another; and Simplified packaging and configuration.

One of the advantages of application scoping feature is that it improves application isolation by creating a private naming context for each application component. The global naming context would only be used for global services or possibly sharing objects between applications. This isolation will minimize naming clashes between applications since environment entries for an application will be stored in its private context. Each module (or component) in an application will have its own component environment. This naming context is only accessible by that component and is not visible by any other components. A component's naming context will be accessible via java:comp/env.

Application Scoping does not extend the naming context by introducing the new application naming scope (referred to as java:/app/env in some discussions). However, there may be an internal context at the application level for the container implementation to use for wiring together links between modules. From the application programmers's perspective there exists two naming contexts, the read-only application component naming context accessed via java:comp/env and the global naming context.

1. Application Scoped JNDI Tree

The invention provides a convenient application packaging and deployment methodology that allows the deployer to specify during the deployment process any resources that will be needed by the application. In the context of the invention an application is usually a J2EE application (an EAR file). When the application is deployed the necessary resources must also be deployed. The traditional method is to modify the global JNDI tree. The Java Naming Directory Interface (JNDI) provides naming and directory functionality for the system, and allows applications to perform standard directory operations. JNDI is the primary mechanism by which applications store and retrieve Java objects, and is typically independent of any specific implementation. In the traditional JNDI tree, the application environment comprises a number of subtrees or subcomponents of the global JNDI tree, and is initialized as part of the system startup process. However, one of the problems with this traditional method of global JNDI and it's use in application packaging and deployment is that it typically involves the input of a system administrator to configure the application to properly run within the global environment. Typically, the administrator would accomplish this configuration process using a configuration tool in which they would modify the global JNDI tree.

Systems incorporating the invention benefit from moving a lot of the application configuration process from the global-JNDI level to a more application specific level. Particularly, resources that are needed by the application can be stored in an application-specific JNDI tree, and thus "scoped" to that particular application. As additional new applications are added to the system, they can be specified in this way, and the overall result is fewer changes at the system-wide or global level. The invention does this by moving the logic from a global-centric model to a more application-centric model. The JNDI tree is reworked to allow for an application-private JNDI section. This private JNDI section then acts as a private data structure or repository for the application. Also, the application component environment is initialized with the application itself, requiring little input from the system administrator. As applications advertise services, components can access them.

Uses of such application-private JNDI tree include scoped JDBC (Java DataBase Connector) for providing application-scoped access to databases, and scoped security. Several examples are described below to illustrate the capabilities of embodiments of the invention, and to describe the features therein.

EXAMPLE 1

Application scoped EJBs

Traditionally, EJBs were always bound into the global JNDI tree, and a weblogic-specific deployment descriptor was necessary to resolve a link from the component-local jndi tree (java:/comp/env) and the global tree. In accordance with the invention, an <ejb-ref> can be resolved within the application by using the ejb-name in the ejb-link tag, as in:

```
        <web-app>
            ...
            <ejb-ref>
                <ejb-ref-name>ejb/trader</ejb-ref-name>
                <ejb-ref-type>Session</ejb-ref-type>
                <home>don.j2ee.trader.TraderHome</home>
                <remote>don.j2ee.trader.Trader</remote>
 +---           <ejb-link>statelessSession</ejb-link>
 |          </ejb-ref>
 |      </web-app>
 |
 |      <ejb-jar>
 |          <enterprise-beans>
 |              <session>
 +-->               <ejb-name>statelessSession</ejb-name>
                ...
        </ejb-jar>
```

This is in accordance with the J2EE specification. Also in accordance with the J2EE spec, the <ejb-link> element may qualify the ejb reference using the syntax:

```
<ejb-link>ejbfilename.jar#ejb-name</ejb-link>
```

This is necessary because the ejb-name is only guaranteed to be unique within the ejb-jar, not within the application. Note that it is not necessary to specify the global JNDI name of the EJB home in the weblogic-ejb-jar.xml (as would be required today), and if there is no other weblogic-specific information, it should be possible to omit the weblogic-ejb-jar.xml file altogether. Similarly, it is not necessary to map the ejb-ref-name to a global jndi name in the webapp's weblogic.xml file as is required today, and if there are no other weblogic-specific entries, it should be possible to omit the weblogic.xml file altogether.

EXAMPLE 2

Application Scoped EJBS, with Defaulty Lookups

Lazy application programmers may avoid specifying the <ejb-ref> declarations in their deployment descriptors, and instead look up EJBs in JNDI directly. This can be done today by looking up EJBs in the global JNDI tree from application code. In accordance with the invention a helperclass is provided that will perform JNDI lookups in a defaulting fashion, such that it first searches the local tree (java:/comp/env), then in the app-scoped tree (java:/app/env?), and then in the global JNDI tree to resolve references. For example:

```
DefaultyContext dctx = new DefaultyContext(new InitialContext( ));
TraderHome th = (TraderHome) dctx.lookup("statelessSession");
```

The DefaultyContext would look for the following names, by default:
1. java:/comp/env/statelessSession (local)
2. java:/app/env/statelessSession (app)
3. statelessSession (global)

Note: The DefaultyContext helper class is only necessary if you don't create the reference-descriptor stanzas.

Implementation

For each application, we create an application-scoped JNDI context, which will have subcontexts for components and application scoped resources.

Figure 1:
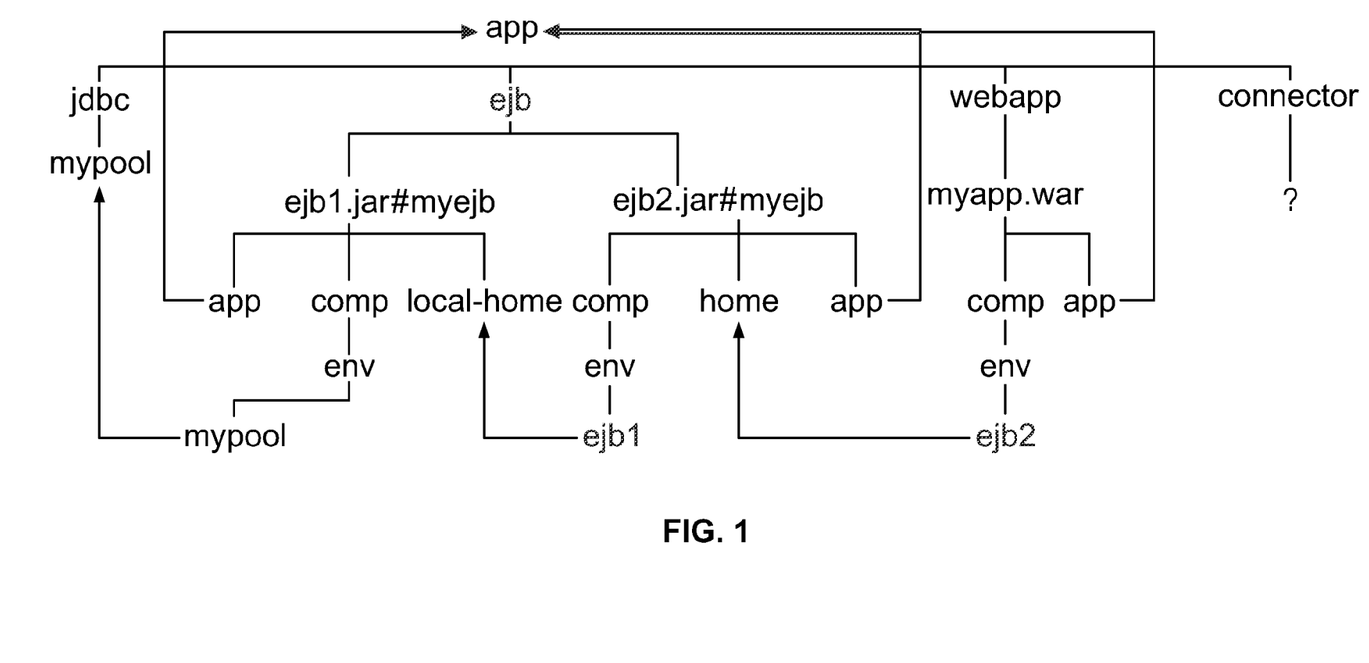
FIG. 1 is a schematic of an application-scoped JNDI tree for an application with a jdbc connection pool, two ejbs, and a webapp in accordance with an embodiment of the invention.

FIG. 1 shows how the application-scoped JNDI tree would look for an application with a jdbc connection pool, two ejbs, and a webapp. In this example, the connection pool named "mypool", is referenced by ejb1 via the the ejb's local java:comp/env environment. The WebApp's environment contains a link to an ejb in ejb2.jar.

```
application.xml
<application>
    <display-name>MyApp</display-name>
    <description>My Application</description>
    <module>
        <web>
            <web-uri>myapp.war</web-uri>
            <context-root>myapp</context-root>
        </web>
    </module>
    <module>
        <ejb>ejb1.jar</ejb>
    </module>
    <module>
        <ejb>ejb2.jar</ejb>
    </module>
</application>
weblogic-application.xml
<weblogic-application>
    <data-source-name>mypool</data-source-name>
    <connection-factory>
        <global-jndi-name>myConnectionFactory</global-jndi-name>
    </connection-factory>
</weblogic-application>
ejb1.jar: ejb-jar.xml
<ejb-jar>
    <enterprise-beans>
        <session>
            <ejb-name>myejb</ejb-name>
            <local-home>mypackage.ejb1.MyHome</local-home>
            <local>mypackage.ejb1.MyRemote</local>
            <ejb-class>mypackage.ejb1.MyBean</ejb-class>
            <session-type>Stateless</session-type>
            <transaction-type>Container</transaction-type>
            <resource-ref>
                <res-ref-name>mypool</res-ref-name>       <!-- links ejb1
                                                              to mypool -->
                <res-type>javax.sql.DataSource</res-type>
                <res-auth>Container</res-auth>
            </resource-ref>
        </session>
```

-continued

```
        </enterprise-beans>
</ejb-jar>
ejb2.jar: ejb-jar.xml
<ejb-jar>
        <enterprise-beans>
                <session>
                        <ejb-name>myejb</ejb-name>
                        <home>mypackage.ejb2.MyHome</home>
                        <remote>mypackage.ejb2.MyRemote</remote>
                        <ejb-class>mypackage.ejb2.MyBean</ejb-class>
                        <session-type>Stateless</session-type>
                        <transaction-type>Container</transaction-type>
                        <ejb-local-ref>
                                <description>The Other Been</description>
                                <ejb-ref-name>ejb1</ejb-ref-name>
                                <ejb-ref-type>Session</ejb-ref-type>
                                <local-home>mypackage.ejb1.MyHome</home>
                                <local>mypackage.ejb1.MyRemote</local>
                                <ejb-link>ejb1.jar#myejb</ejb-link>        <!-- links ejb2
                                                                              to ejb1 -->
                        </ejb-local-ref>
                </session>
        </enterprise-beans>
</ejb-jar>
web.xml
<web-app>
        <servlet>
                <servlet-name>myapp</servlet-name>
                <servlet-class>mypackage.myapp.MyServlet</servlet-class>
        </servlet>
        <servlet-mapping>
                <servlet-name>myapp</servlet-name>
                <url-pattern>myapp</url-pattern>
        </servlet-mapping>
    <ejb-ref>
        <description>Link to an EJB</description>
        <ejb-ref-name>ejb2</ejb-ref-name>
        <ejb-ref-type>Session</ejb-ref-type>
        <home>mypackage.ejb2.MyHome</home>
        <remote>mypackage.ejb2.MyRemote</remote>
        <ejb-link>ejb2.jar#myejb</ejb-link>        <!-- links the webapp
                                                       to ejb2 -->
    </ejb-ref>
</web-app>
```

40

Note that the link from ejb1 to my pool relies on the res-ref-name being equal to the data-source-name. The following section lists the files that are used by the invention to support application scoping.

```
Common
weblogic/j2ee/Application.java:              Create app-scoped tree
EJB
weblogic/j2ee/EJBComponent.java:             Pass app scoped tree
weblogic/ejb20/deployer/Deployer.java        Bind home & local-home
weblogic/ejb20/deployer/EnvironmentBuilder.java
                                             Link to home/local-home
weblogic/ejb20/compliance/BeanClassChecker.java
                                             Relax JNDI-name checks
weblogic/ejb20/deployer/ClientDrivenBeanInfoImpl.java
                                             Allow null JNDI name
weblogic/ejb20/manager/StatelessManager.java
                                             Allow null JNDI name
weblogic/ejb20/internal/BaseEJBHome.java
                                             Allow null JNDI name
Servlet
weblogic/j2ee/WebAppComponent.java:           Pass app scoped tree
weblogic/servlet/internal/HttpServer.java     Pass app scoped tree
weblogic/servlet/internal/WebAppServletContext.java
                                             Gather ejbRef list
weblogic/deployment/EnvironmentBuilder.java   Link to home
Servlet call stack:
Servlet:   weblogic.deployment.descriptors.EJBReference
```

-continued

```
weblogic.deployment.descriptors.xml.EJBReferencQe
    weblogic.j2ee.Application.java
        weeblogic.j2ee.WebAppComponent
        weblogic.servlet.internal.HttpServer.java
    calls    weblogic/servlet/internal/WebAppServletContext.java
    calls on   weblogic.servlet.internal.dd.WebAppDescriptor
        (populated by DOM tree)
        (implements
    weblogic.management.descriptors.webapp.WebAppDescriptorMBean)
returns array of    weblogic.servlet.internal.dd.EJBReference
                and            weblogic.servlet.internal.dd.EJBLocalReference
            (implements weblogic.management.descriptors.webapp.EjbRefMBean)
used to create    weblogic.deployment.descriptors.xml.EJBReference
        (extends weblogic.deployment.descriptors.EJBReference)
            calls   weblogic.deployment.EnvironmentBuilder
EJB
weblogic.management.descriptors.ejb11.EJBRefMBean
```

Context Initialization

An component's naming context is set up as the application is being initialized based on information defined in the deployment descriptor files in the application (application.xml and weblogic-application.xml) and the descriptor files in any modules that are part of the application (web.xml, ejb.xml, etc.). The application component's naming context is in accordance with the J2EE specifications. Only those items defined at the time of deployment are used to populate the application's naming context. The application component context is not replicated across application targets. Each server or cluster has a local instance of the context. This means that modules of a tiered application will have separate copies of the component environment.

Helper for Managing Multiple Trees

In accordance with an embodiment of the invention there is no hierarchal scoping of the JNDI trees. A JNDI lookup using java:/comp/env locates a JNDI name through the standard linking mechanism in either the application component's naming space or the global naming space depending on the link. A global JNDI lookup will only search the global naming tree. It does not first attempt to find the named entry in the application component's context. This implies that a developer will need to manage two context handles if they want to get some things from the global context and others from the local. To this end, embodiments of the invention include a helper class to perform logic like:

```
try {
    // look for object in local tree
catch (NotFound) {
    // look for object in global tree
}
```

How Component Elements are Bound

The following section provides an overview of how things are scoped in the new environment model.

How a User Accesses Something in their Component Environment

As described in the J2EE specification, the user gets their component environment context by looking up "java:comp/env"

```
Context initCtx = new InitialContext( );
Context myEnv = (Context)initCtx.lookup("java:comp/env");
```

To retrieve something from this environment context the user looks it up by name.

```
AnEjbHome home = (AnEjbHome) myEnv.lookup("ejb1");
```

How Things get Bound into the Component Environment

Application objects are bound into the component environment based on information from the standard J2EE deployment descriptors. References to objects in the global environment also require entries in server (e.g. WebLogic) specific descriptors so that corresponding links can be made in the component environment.

Objects within the Application

If a developer looks up an ejb home or resource that exists within their application, then they must create an ejb-ref (with the ejb-link parameter) or resource-ref in the standard deployment descriptor for your component. Entries will be created in the component environment based on this information.

Objects Outside of the Application

If a developer looks up an ejb home or resource outside of their application, then:
1. They must create an ejb-ref or resource ref.
2. They must add a reference-descriptor stanza to link the ejb-ref or resource-ref to a name in the global environment.

Software Interfaces

No specific requirements beyond an interface to satisfy the functional requirements in the previous section. The application local tree will be set up automatically.

2. Application Scoped JDBC Pools

An application scoped JDBC pool is a JDBC connection pool that is configured within and initialized with the application. It is usable only by the application it is configured with. Access to the DataSource for such a pool is via the application scoped component environment described in the previous section. The configuration of an application scoped JDBC pool is performed using a server-specific deployment descriptor file (e.g. for WebLogic, a weblogic-application.xml file) which is located in the META-INF directory of the earfile. This configuration uses a global connection factory which is defined by an administrator in a configuration Mbean of type JDBCConnectionFactory. The connection factory provides an internal interface which the container can use to create connections to populate its connection pools.

The connection factory calls the get credentials method of the weblogic.security.service.CredentialManager class passing a JDBCResource object that describes the resource and the alias name from the deployment descriptor. The CredentialManager returns a Java object that can be cast to a PasswordCredential that holds the actual username and password to be used. An authorization check is performed to make sure that the caller is authorized to obtain this information. This is necessary so that this interface can't be used as a mechanism to obtain usernames and passwords for resources by just anybody.

An instance of the pool will be created for each instance of the application that is created. An error in creating the JDBC pool causes the deployment to fail.

Software Interfaces

The user will only ever see this as configuration information. Listed below are the Mbean interface for the config.xml and a section of the DTD to be added to the weblogic-application.xmlfile which is located under the META-INF directory of an EAR file.

```
Config.xml Settings (Mbean)
    public interface JDBCDataSourceFactoryMBean {
    /**
     * The database user name. This may be overridden by
     * user-name in the descriptor.
     */
      String getUserName( )
      void setUserName(String s)
    /**
       * The connection URL. This may be overridden by
       * url in the descriptor
       */
      String getURL( );
      void setURL(String s);
      /**
     * The name of the driver. This may be overridden by
     * driver-name in the descriptor.
       */
      String getDriverName( )
      void setDriverName(String s);
    /**
     * default connection properties
     */
      Map getproperties( );
      void setproperties(Map m);
    /**
     * the name of this data source factory
     * in the global JNDI tree
     */
      String getJndiName( )
      void setJndiName(String s);
```

3. Application Deployment Descriptor Elements

The following sections describe various deployment descriptor values and options for J2EE applications on a server such as WebLogic Server. Two deployment descriptors are required: a J2EE standard deployment descriptor named application.xml, and a WebLogic-specific runtime deployment descriptor named weblogic-application.xml. Although the following description describes a particular WebLogic implementation of the invention, it will be evident to one skilled in the art that the teachings described herein may be applied to other application server and to other server environments.

The following sections describe an embodiment of the application.xml file. The application.xml file is the deployment descriptor for EnterpriseApplication Archives. The file is located in the META-INF subdirectory of the application archive. It must begin with the following DOCTYPE declaration:

```
<!DOCTYPE application PUBLIC "-//Sun Microsystems,
Inc.//DTD J2EE Application 1.2//EN"
"http://java.sun.com/j2ee/dtds/application_1_2.dtd">
```

Figure 2:
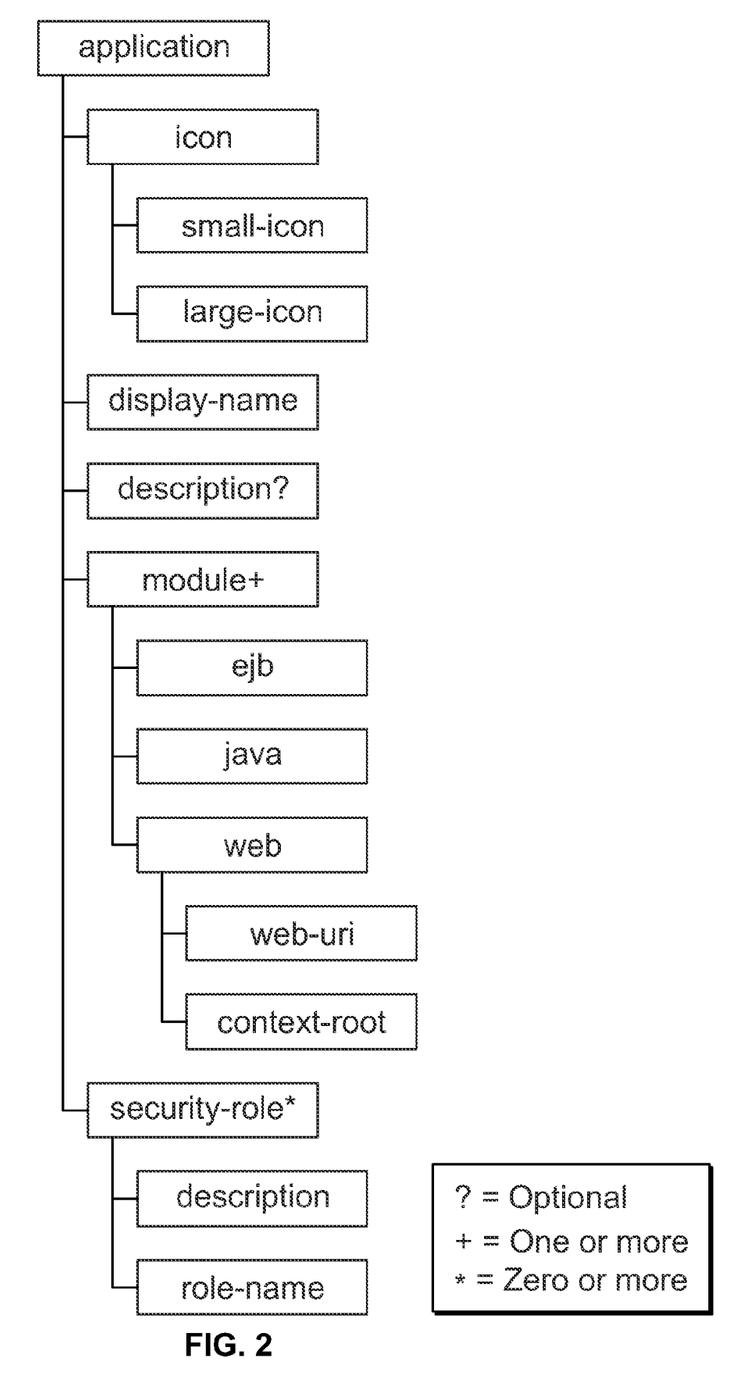
FIG. 2 is a schematic of the structure of the application-.xml deployment descriptor in accordance with an embodiment of the invention.

FIG. 2 summarizes the structure of the application.xml deployment descriptor. The following sections describe each of the elements that can appear in the file. Many of the elements are optional but are described here for completeness.

application application is the root element of the application deployment descriptor. The elements within the application element are described in the following sections.

icon

The icon element specifies the locations of small and large images that represent the application in a GUI tool.

small-icon

Optional. Specifies the location for a small (16×16 pixel) .gif or .jpg image used to represent the application in a GUI tool.

large-icon

Optional. Specifies the location for a large (32×32 pixel) .gif or .jpg image used to represent the application in a GUI tool.

display-name

Optional. The display-name element specifies the application display name, a short name that is intended to be displayed by GUI tools.

description

The optional description element provides descriptive text about the application.

module

The application.xml deployment descriptor contains one module element for each module in the Enterprise Archive file. Each module element contains an ejb, java, or web element that indicates the module type and location of the module within the application. An optional alt-dd element specifies an optional URI to the post-assembly version of the deployment descriptor.

ejb

Defines an EJB module in the application file. Contains the path to an EJB JAR file in the application. Example:

```
<ejb>petStore_EJB.jar</ejb>
``` java

Defines a client application module in the application file. Example:

```
<java>client_app.jar</java>
``` web

Defines a Web application module in the application file. The web element contains a web-uri element and, optionally, a context-root element.

web-uri: Defines the location of a Web module in the application file. This is the name of the .war file.

context-root: Optional. Specifies a context root for the Web application. Example:

```
<web>
    <web-uri>petStore.war</web-uri>
    <context-root>estore</context-root>
</web>
``` security-role

The security-role element contains the definition of a security role which is global to the application. Each security-role element contains an optional description element, and a role-name element.

description

Optional. Text description of the security role.

role-name

Required. Defines the name of a security role or principal that is used for authorization within the application. Roles are mapped to users or groups in the weblogic-application.xml deployment descriptor. Example:

```
<security-role>
    <description>the gold customer role</description>
    <role-name>gold_customer</role-name>
</security-role>
<security-role>
    <description>the customer role</description>
    <role-name>customer</role-name>
</security-role>
```

4. Weblogic-Application.xml Deployment Descriptor Elements

The following sections describe an embodiment of the weblogic-application.xml file. The weblogic-application.xml file is the deployment descriptor for BEA WebLogic Server extensions. This is where the developer configures features such as application-scoped JDBC Pools and EJB Caching. The file is located in the META-INF subdirectory of the application archive. It must begin with the following DOCTYPE declaration:

```
<!DOCTYPE weblogic-application PUBLIC "-//BEA Systems, Inc.//DTD
WebLogic Application 7.0.0//EN"
NEED URL:
"D:/weblogic/src_131sj/classes/weblogic/j2ee/dd/xml/weblogic-appl
ication_1_0.dtd">
```

Figure 3A:
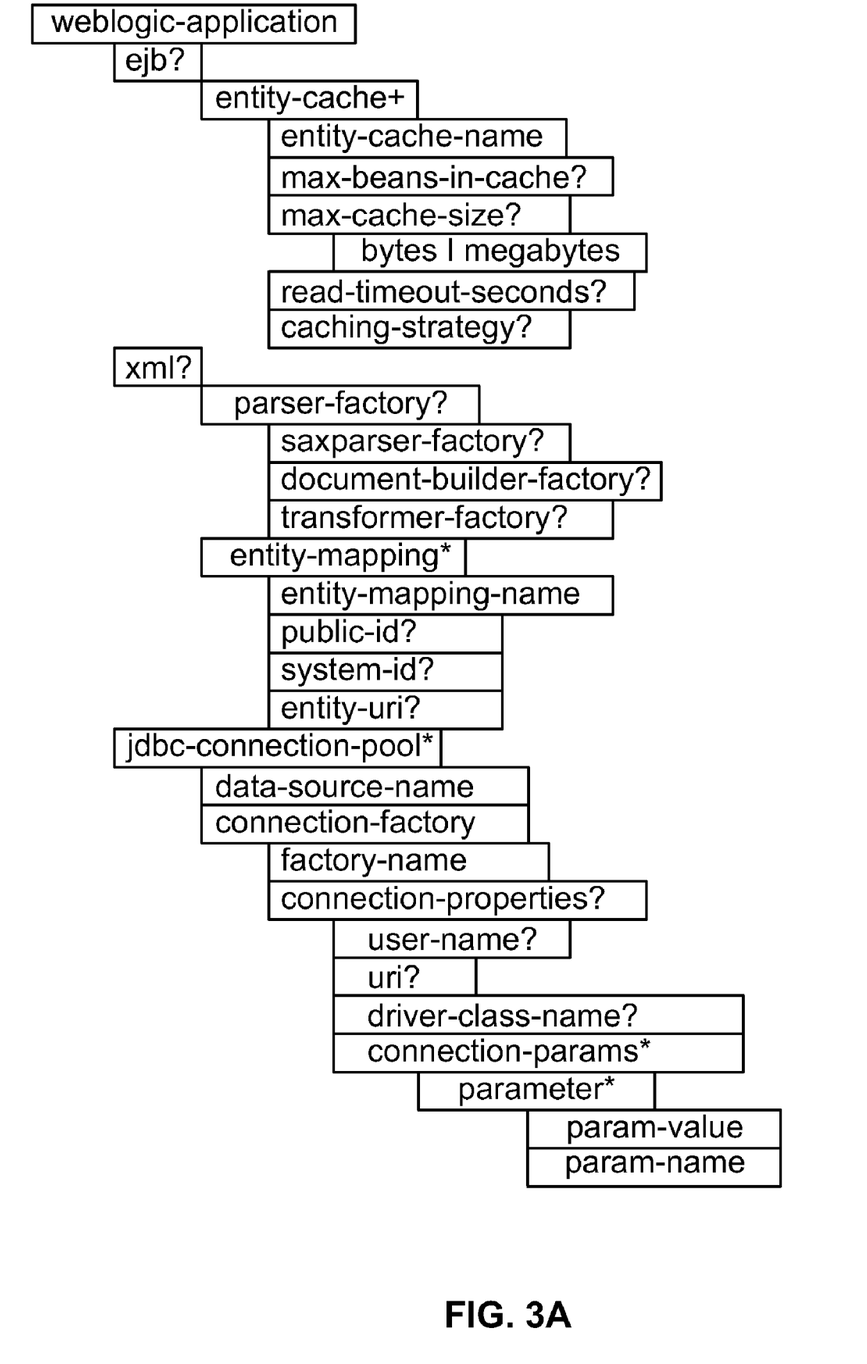
FIG. 3 is a schematic of the structure of the weblogic-application.xml deployment descriptor in accordance with an embodiment of the invention.
Figure 3B:
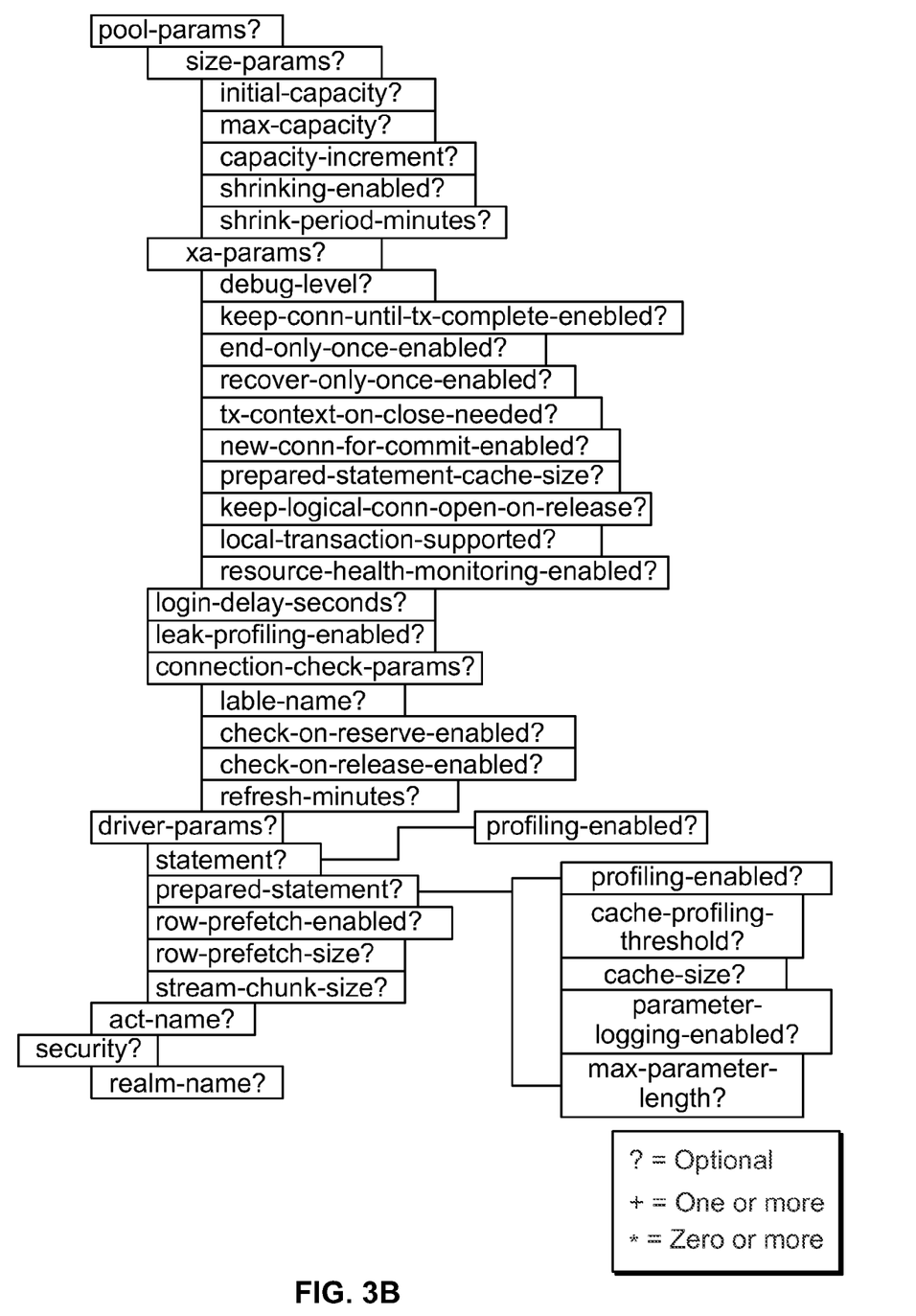

FIG. 3 summarizes the structure of the weblogic-application .xml deployment descriptor. The following sections describe each of the elements that can appear in the file.

weblogic-application

The weblogic-application is the root element of the application deployment descriptor.

ejb

Optional. The ejb element contains information that is specific to the EJB modules that are part of a WebLogic application. Currently, one can use the ejb element to specify one or more application level caches that can be used by the application's entity beans.

entity-cache

One or more. The entity-cache element is used to define a named application level cache that is used to cache entity EJB instances at runtime. Individual entity beans refer to the application-level cache that they must use, referring to the cache name. There is no restriction on the number of different entity beans that may reference an individual cache. Application-level caching is used by default whenever an entity bean doesn't specify its own cache in the weblogic-ejb-jar.xml descriptor. Two default caches named ExclusiveCache and MultiVersionCache are used for this purpose. An application may explicitly define these default caches to specify non-default values for their settings. Note that the caching-strategy cannot be changed for the default caches. By default, a cache uses max-beans-in-cache with a value of 1000 to specify its maximum size. Example:

```
<entity-cache>
    <entity-cache-name>ExclusiveCache</entity-cache-name>
    <max-cache-size>
        <megabytes>50</megabytes>
    </max-cache-size>
</entity-cache>
``` entity-cache-name

The entity-cache-name element specifies a unique name for an entity bean cache. The name must be unique within an ear file and may not be the empty string. Example:

```
<entity-cache-name>ExclusiveCache</entity-cache-name>
``` max-beans-in-cache?

Optional. The max-beans-in-cache element specifies the maximum number of entity beans that are allowed in the cache. If the limit is reached, beans may be passivated. If 0 is specified, then there is no limit. This mechanism does not take into account the actual amount of memory that different entity beans require. Default Value: 1000 max-cache-size?

The max-cache-size element is used to specify a limit on the size of an entity cache in terms of memory size—expressed either in terms of bytes or megabytes. A bean provider should provide an estimate of the average size of a bean in the weblogic-ejb-jar.xml descriptor if the bean uses a cache that specifies its maximum size using the max-cache-size element. By default, a bean is assumed to have an average size of 100 bytes.

bytes|megabytes—The size of an entity cache in terms of memory size, expressed in bytes or megabytes. Used in the max-cache-size element.

read-timeout-seconds?

Optional. The read-timeout-seconds element specifies the number of seconds between ejbLoad calls on a read-only entity bean. If read-timeout-seconds is set to 0, ejbLoad will only be called when the bean is brought into the cache.

caching-strategy?

Optional. The caching-strategy element specifies the general strategy that the EJB container uses to manage entity bean instances in a particular application level cache. A cache buffers entity bean instances in memory and associates them with their primary key value. The caching-strategy element can only have one of the following values:

Exclusive—Caches a single bean instance in memory for each primary key value. This unique instance is typically locked using the EJB container's exclusive locking when it is in use, so that only one transaction can use the instance at a time.

MultiVersion—Caches multiple bean instances in memory for a given primary key value. Each instance can be used by a different transaction concurrently.

Default Value: MultiVersion

Example:

```
<caching-strategy>Exclusive</caching-strategy>
``` xml?

Optional. The xml element contains information about parsers and entity mappings for xml processing that is specific to this application.

parser-factory?

Optional. The parser-factory element contains three elements: saxparser-factory?, document-builder-factory?, and transformer-factory?.

saxparser-factory?

Optional. The saxparser-factory element allows you to set the SAXParser Factory for the XML parsing required in this application only. This element determines the factory to be used for SAX style parsing. If you do not specify the saxparser-factory element setting, the configured SAXParser Factory style in the Server XML Registry is used. Default Value: Server XML Registry setting.

document-builder-factory?

Optional. The document-builder-factory element allows you to set the Document Builder Factory for the XML parsing required in this application only. This element determines the factory to be used for DOM style parsing. If you do not specify the document-builder-factory element setting, the configured DOM style in the ServerXML Registry is used. Default Value: ServerXML Registry setting transformer-factory?

Optional. The transformer-factory element allows you to set the Transformer Engine for the style sheet processing required in this application only.

entity-mapping*

Zero or more. The entity-mapping element is used to specify entity mapping. This mapping determines alternative entityuri for a given public/system ID. The default place to look for these entityuri is the lib/xml/registry directory.

entity-mapping-name

The entity-mapping-name element specifies the name for this entity mapping.

public-id?

Optional. The public-id element specifies the public ID of the mapped entity.

system-id?

Optional. The system-id element specifies the system ID of the mapped entity.

entity-uri?

Optional. The entity-uri element specifies the entityuri for the mapped entity.

jdbc-connection-pool*

Zero or more. The jdbc-connection-pool element specifies an application-scoped JDBC connection pool.

data-source-name

The data-source-name element specifies the JNDI name in the application-specific JNDI tree.

connection-factory

The connection-factory element specifies the name of the connection in the global JNDI tree.

factory-name

The factory-name element specifies the name of a JDBC-DataSourceFactoryMBean in the config.xml file.

connection-properties?

Optional. The connection-properties element specifies the connection parameters that define overrides for default connection factory settings.

user-name?—Optional. The user-name element is used to override UserName in the JDBCDataSourceFactoryMBean.

url?—Optional. The url element is used to override URL in the JDBCDataSourceFactoryMBean.

driver-class-name?—Optional. The driver-class-name element is used to override DriverName in the JDBCDataSourceFactoryMBean.

connection-params*—Zero or more parameter+(param-value, param-name)—One or more pool-params?

Optional. The pool-params element defines parameters that affect the behavior of the pool.

size-params?

Optional. The size-params element defines parameters that affect the number of connections in the pool.

initial-capacity?—Optional max-capacity?—Optional capacity-increment?—Optional shrinking-enabled?—Optional shrink-period-minutes?—Optional xa-params?

Optional. The xa-params element defines the parameters for the XA data sources.

debug-level?—Optional keep-conn-until-tx-complete-enabled?—Optional end-only-once-enabled?—Optional recover-only-once-enabled?—Optional tx-context-on-close-needed?—Optional new-conn-for-commit-enabled?—Optional prepared-statement-cache-size?—Optional keep-logical-conn-open-on-release?—Optional local-transaction-supported?—Optional resource-health-monitoring-enabled?—Optional login-delay-seconds?

Optional leak-profiling-enabled?

Optional connection-check-params?

Optional. The connection-check-params define whether, when, and how connections in a pool will be checked to make sure they are still alive.

table-name?—Optional. The table-name element defines a table in the schema that can be queried.

check-on-reserve-enabled?—Optional. If the check-on-reserve-enabled element is set to true, then the connection will be tested each time before it is handed out to a user.

check-on-release-enabled?—Optional. If the check-on-release-enabled element is set to true, then the connection will be tested each time a user returns a connection to the pool.

refresh-minutes?—Optional. If the refresh-minutes element is defined, a trigger is fired periodically (based on the number of minutes specified). This trigger checks each connection in the pool to make sure it is still valid.

driver-params?
Optional. The driver-params element is used to set behavior on WebLogic Server drivers.
statement?
Optional
profiling-enabled?—Optional
prepared-statement?
Optional
profiling-enabled?—Optional
cache-profiling-threshold?—Optional
cache-size?—Optional
parameter-logging-enabled?—Optional
max-parameter-length?—Optional
row-prefetch-enabled?
Optional
row-prefetch-size?
Optional
stream-chunk-size?
Optional
aci-name?
Optional
security?
Optional. The security element specifies the security information for the application.
realm-name?
Optional. The realm-name element specifies a security realm that will be used by the application. If none is specified, the system default realm is used.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, and with WebLogic-type deployment files, other application server environments and deployment methods may use and benefit from the invention. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system including a processor for application scoping in a Java environment, comprising:
    means for deploying a plurality of applications, including for each application an enterprise archive file and an application deployment descriptor file that specifies resources within the enterprise archive file;
    a computer storage medium that includes a JNDI tree stored thereon, wherein the JNDI tree further includes
        a global JNDI tree, that specifies resources that are accessible system-wide by all of the applications, and
        a plurality of application-private JNDI sections, including an application-private JNDI section for each one of the plurality of applications, that includes means for specifying the resources that are in that application's enterprise archive file and that are private to that one application, wherein the application-private JNDI sections are created by the system at deployment time using information in the application deployment descriptor files; and
    means for providing a helper function that receives requests from a particular application to access a resource, and looks up the resource in the application-private JNDI section for that particular application, to access the resource in the application enterprise archive file, before looking up the resource in the global JNDI tree.

2. The system of claim 1 further comprising:
    a mechanism for initializing an application component environment with the application itself, and allowing applications to advertise services so that components can access them.

3. The system of claim 2 wherein the system includes an application scoped JDBC pool configured within and initialized with the application, and usable only by the application with which it is configured.

4. The system of claim 3 wherein access to a DataSource for the JDBC pool is via the application scoped component environment.

5. The system of claim 1, wherein each application component's naming context is set up as the application is being initialized based on information defined in the application deployment descriptor file and in any descriptor files in modules that are part of the application.

6. The system of claim 5, wherein only those items defined at the time of deployment are used to populate the application component's naming context, and wherein each of a plurality of servers maintain their own local instance of the context at that server.

7. A computer executable method for application scoping in a Java environment, comprising the steps of:
    deploying a plurality of applications in a computer system, including for each application an enterprise archive file and an application deployment descriptor file that specifies resources within the enterprise archive file;
    creating a JNDI tree wherein the JNDI tree further includes
        a global JNDI tree, that specifies resources that are accessible system-wide by all of the applications, and
        a plurality of application-private JNDI sections, including an application-private JNDI section for each one of the plurality of applications, that specifies resources in that application's enterprise archive file and that are private to that one application, wherein the application-private JNDI sections are created by the system at deployment time; and subsequently receiving requests from a particular application to access a resource, and looking up the resource in the application-private JNDI section for that particular application, before looking up the resource in the global JNDI tree.

8. The method of claim 7, further comprising the step of: initializing an application component environment with the application itself, and allowing applications to advertise services so that components can access them.

9. The method of claim 8 wherein the JNDI tree is used to provide an application scoped JDBC pool configured within and initialized with the application, and usable only by the application with which it is configured.

10. The method of claim 9 wherein access to the DataSource for the JDBC pool is via the application scoped component environment.

11. The computer executable method of claim 7, wherein each application component's naming context is set up as the application is being initialized based on information defined in the application deployment descriptor file and in any descriptor files in modules that are part of the application.

12. The computer executable method of claim 11, wherein only those items defined at the time of deployment are used to populate the application component's naming context, and wherein each of a plurality of servers maintain their own local instance of the context at that server.

13. A computer executable method for application scoping in a Java environment, comprising the steps of:

providing a computer readable medium that includes a JNDI tree wherein the JNDI tree further includes a global JNDI tree, wherein application resources are accessible to all applications;

deploying a plurality of applications in a computer system, including for each application reading an enterprise archive file and an application deployment descriptor file that specifies resources within the enterprise archive file, and wherein the resources of each one of the plurality of applications are then deployed into its own application-private JNDI section; and subsequently receiving requests for a particular application's resources, retrieving those resources from the particular application's application-private JNDI section, and if not found, retrieving those resources from the global JNDI tree.

14. The method of claim 13, further comprising the steps of:

initializing an application component environment with the application; and advertising the application's services so they can be used by other components.

15. The method of claim 13, further comprising the step of deploying and initializing a JDBC pool into the application private JNDI section.

16. The method of claim 13 wherein a DataSource for the JDBC pool is accessed via the application scoped component environment.

17. The computer executable method of claim 13, wherein each application component's naming context is set up as the application is being initialized based on information defined in the application deployment descriptor file and in any descriptor files in modules that are part of the application.

18. The computer executable method of claim 17, wherein only those items defined at the time of deployment are used to populate the application component's naming context, and wherein each of a plurality of servers maintain their own local instance of the context at that server.

* * * * *